United States Patent
Wang et al.

(10) Patent No.: US 10,145,740 B2
(45) Date of Patent: Dec. 4, 2018

(54) SENSING MULTIPLE PEAK WAVELENGTHS USING COMBINATION OF DUAL-BAND FILTERS

(71) Applicant: VisEra Technologies Company Limited, Hsin-Chu (TW)

(72) Inventors: Wei-Ko Wang, Taoyuan (TW); Yu-Jen Chen, Taoyuan (JP)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 0 days.

(21) Appl. No.: 15/443,044

(22) Filed: Feb. 27, 2017

(65) Prior Publication Data

US 2018/0245978 A1   Aug. 30, 2018

(51) Int. Cl.
*G01J 3/12*   (2006.01)
*G01J 3/28*   (2006.01)

(52) U.S. Cl.
CPC .............. *G01J 3/12* (2013.01); *G01J 3/2803* (2013.01); *G01J 2003/1213* (2013.01); *G01J 2003/1282* (2013.01); *G01J 2003/2806* (2013.01)

(58) Field of Classification Search
CPC .... G01J 3/12; G01J 3/2803; G01J 2003/2806; G01J 2003/1282; G01J 2003/1213
See application file for complete search history.

(56) References Cited

U.S. PATENT DOCUMENTS

| 2017/0040367 A1 | 2/2017 | Wang |
| 2017/0125614 A1* | 5/2017 | Sik .................... H01L 31/02165 |

FOREIGN PATENT DOCUMENTS

| JP | 59230120 A | 12/1984 |
| JP | S6457134 A | 3/1989 |
| JP | 2003057111 A | 2/2003 |
| JP | 2005207830 A | 8/2005 |
| JP | 2012127917 A | 7/2012 |
| JP | 2013051544 A | 3/2013 |
| JP | 2017032537 A | 2/2017 |

OTHER PUBLICATIONS

Office Action dated Sep. 18, 2018 in corresponding JP Application No. 2017-121934, 11 pages.

* cited by examiner

*Primary Examiner* — Hwa Lee
(74) *Attorney, Agent, or Firm* — Muncy, Geissler, Olds & Lowe, P.C.

(57) ABSTRACT

A spectrum-inspection device includes: a sensor unit array including a first sensor unit and a second sensor unit; a dual-band pass filter disposed on the sensor unit array to cover the first sensor unit and the second sensor unit, wherein the dual-band pass filter allows a first waveband and a second waveband of a light beam to pass through; and a filter disposed on the dual-band pass filter to cover the second sensor unit, wherein the filter allows wavelengths of a light beam longer than a first wavelength to pass through, wherein the first wavelength is longer than a peak wavelength of the first waveband and shorter than a peak wavelength of the second waveband.

8 Claims, 8 Drawing Sheets

SENSING MULTIPLE PEAK WAVELENGTHS USING COMBINATION OF DUAL-BAND FILTERS

BACKGROUND OF THE INVENTION

Field of the Invention

The present disclosure relates to a spectrum-inspection device, and in particular to a spectrum-inspection device capable of sensing at least two peak wavelengths of an incident light beam with a simple structure.

Description of the Related Art

A kind of conventional spectrum meter is based on the Fabry-Perot interference theorem. According to the Fabry-Perot interference theorem, a narrow waveband pass filter with a specified thickness can make a specified waveband of a light beam pass through. Therefore, narrow waveband pass filters of different thickness can be disposed on the sensor units (or the pixels), so that each sensor unit can catch a desired waveband of a light beam, respectively. However, variations in the thickness of the narrow waveband pass filters will make the manufacturing process more complicated.

Another method to vary the thickness of the narrow waveband pass filters is to arrange the filter layer as a wedged pattern. However, because it is a linear design, this kind of spectrum meter is only used to measure a linear spectrum of a sample, and cannot capture a 2D image. The applications of the spectrum meter are restricted.

Moreover, another kind of spectrum meter uses a multi-film interference filter to make four narrow wavebands of a light beam pass through and an absorption filter pattern to catch each of the four respective narrow wavebands. However, in a limited waveband 300~1100 m, which is a sensible waveband of a silicon-based detector, it is very difficult to coat a multi-film layer which allows four narrow wavebands to pass through. If a multi-film layer is required to allow only two narrow wavebands to pass through, it would make the manufacturing process much easier.

Although those conventional spectrum meters have been generally adequate for their intended purposes, they have not been entirely satisfactory in all respects. Consequently, it is desirable to provide a solution for improving spectrum meters.

BRIEF SUMMARY OF THE INVENTION

A detailed description is given in the following embodiments with reference to the accompanying drawings.

The disclosure provides spectrum-inspection device, including: a sensor unit array including a first sensor unit and a second sensor unit; a dual-band pass filter disposed on the sensor unit array to cover the first sensor unit and the second sensor unit, wherein the dual-band pass filter allows a first waveband and a second waveband of a light beam to pass through; and a filter disposed on the dual-band pass filter to cover the second sensor unit, wherein the filter allows wavelengths of a light beam longer than a first wavelength to pass through, wherein the first wavelength is longer than a peak wavelength of the first waveband and shorter than a peak wavelength of the second waveband.

In the spectrum-inspection device above, the first sensor unit generates a first strength value and the second sensor unit generates a second strength value. A first spectrum value corresponding to the first waveband is obtained from the first strength value minus the second strength value, and a second spectrum value corresponding to the second waveband is obtained from the second strength value.

In another embodiment, the spectrum-inspection device further includes: a second dual-band pass filter disposed on the sensor unit array; and a second filter disposed on the second dual-band pass filter. The sensor unit array further includes a third sensor unit and a fourth sensor unit. The second dual-band pass filter covers the third sensor unit and the fourth sensor unit and allows a third waveband and a fourth waveband of a light beam to pass through. The second filter covers the fourth sensor unit and allows wavelengths of a light beam longer than a second wavelength to pass through. The second wavelength is longer than a peak wavelength of the third waveband and shorter than a peak wavelength of the fourth waveband.

In the spectrum-inspection device above, the peak wavelength of the third waveband is longer than the peak wavelength of the first waveband and shorter than the peak wavelength of the second waveband, and the peak wavelength of the fourth waveband is longer than the peak wavelength of the second waveband.

In the spectrum-inspection device above, the first sensor unit generates a first strength value, the second sensor unit generates a second strength value, the third sensor unit generates a third strength value, and the fourth sensor unit generates a fourth strength value. A first spectrum value corresponding to the first waveband is obtained from the first strength value minus the second strength value, and a second spectrum value corresponding to the second waveband is obtained from the second strength value. A third spectrum value corresponding to the third waveband is obtained from the third strength value minus the fourth strength value, and a fourth spectrum value corresponding to the fourth waveband is obtained from the fourth strength value.

In another embodiment, the spectrum-inspection device further includes: a third dual-band pass filter disposed on the sensor unit array; and a third filter disposed on the third dual-band pass filter. The sensor unit array further includes a fifth sensor unit and a sixth sensor unit. The third dual-band pass filter covers the fifth sensor unit and the sixth sensor unit and allows a fifth waveband and a sixth waveband of a light beam to pass through. The third filter covers the sixth sensor unit and allows wavelengths of a light beam longer than a third wavelength to pass through. The third wavelength is longer than a peak wavelength of the fifth waveband and shorter than a peak wavelength of the sixth waveband.

In the spectrum-inspection device above, the peak wavelength of the fifth waveband is longer than the peak wavelength of the third waveband and shorter than the peak wavelength of the second waveband, and the peak wavelength of the sixth waveband is longer than the peak wavelength of the fourth waveband.

In the spectrum-inspection device above, the first sensor unit generates a first strength value, the second sensor unit generates a second strength value, the third sensor unit generates a third strength value, the fourth sensor unit generates a fourth strength value, the fifth sensor unit generates a fifth strength value, and the sixth sensor unit generates a sixth strength value. A first spectrum value corresponding to the first waveband is obtained from the first strength value minus the second strength value, and a second spectrum value corresponding to the second waveband is obtained from the second strength value. A third spectrum value corresponding to the third waveband is obtained from the third strength value minus the fourth strength value, and a fourth spectrum value corresponding to the fourth waveband is obtained from the fourth strength value. A fifth spectrum value corresponding to the fifth waveband is obtained from the fifth strength value minus the sixth strength value, and a sixth spectrum value corresponding to the sixth waveband is obtained from the sixth strength value.

In another embodiment, the spectrum-inspection device further includes: a fourth dual-band pass filter disposed on the sensor unit array; and a fourth filter disposed on the third dual-band pass filter. The sensor unit array further includes a seventh sensor unit and an eighth sensor unit. The fourth dual-band pass filter covers the seventh sensor unit and the eighth sensor unit and allows a seventh waveband and a eighth waveband of a light beam to pass through. The fourth filter covers the eighth sensor unit and allows wavelengths of a light beam longer than a fourth wavelength to pass through. The fourth wavelength is longer than a peak wavelength of the seventh waveband and shorter than a peak wavelength of the eighth waveband.

In the spectrum-inspection device above, the peak wavelength of the seventh waveband is longer than the peak wavelength of the fifth waveband and shorter than the peak wavelength of the second waveband, and the peak wavelength of the eighth waveband is longer than the peak wavelength of the sixth waveband.

In the spectrum-inspection device above, the first sensor unit generates a first strength value, the second sensor unit generates a second strength value, the third sensor unit generates a third strength value, the fourth sensor unit generates a fourth strength value, the fifth sensor unit generates a fifth strength value, the sixth sensor unit generates a sixth strength value, the seventh sensor unit generates a seventh strength value, and the eighth sensor unit generates an eighth strength value. A first spectrum value corresponding to the first waveband is obtained from the first strength value minus the second strength value, and a second spectrum value corresponding to the second waveband is obtained from the second strength value. A third spectrum value corresponding to the third waveband is obtained from the third strength value minus the fourth strength value, and a fourth spectrum value corresponding to the fourth waveband is obtained from the fourth strength value. A fifth spectrum value corresponding to the fifth waveband is obtained from the fifth strength value minus the sixth strength value, and a sixth spectrum value corresponding to the sixth waveband is obtained from the sixth strength value. A seventh spectrum value corresponding to the seventh waveband is obtained from the seventh strength value minus the eighth strength value, and an eighth spectrum value corresponding to the eighth waveband is obtained from the eighth strength value.

In an embodiment, the first wavelength is 490 nm, the second wavelength is 580 nm, the third wavelength is 650 nm, and the fourth wavelength is 800 nm.

In another embodiment, the first wavelength is 490 nm, the second wavelength is 580 nm, the third wavelength is 650 nm, and the fourth wavelength is 890 nm.

In another embodiment, all of the first wavelength, the second wavelength, the third wavelength, and the fourth wavelength are 490 nm.

In conclusion, a simple structure to sense eight wavebands separately can be obtained. Since the multi-film interference filter that allows two wavebands to pass through is much easier to be manufactured than the multi-film interference filter that allows four wavebands to pass through, the complexity of the process is substantially reduced. Furthermore, the sensor unit array can still be used to capture a 2D image. The application of the spectrum meter is not restricted to one purpose.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Furthermore, the shape, size, and thickness in the drawings may not be drawn to scale or simplified for clarity of discussion; rather, these drawings are merely intended for illustration.

Figure 1:
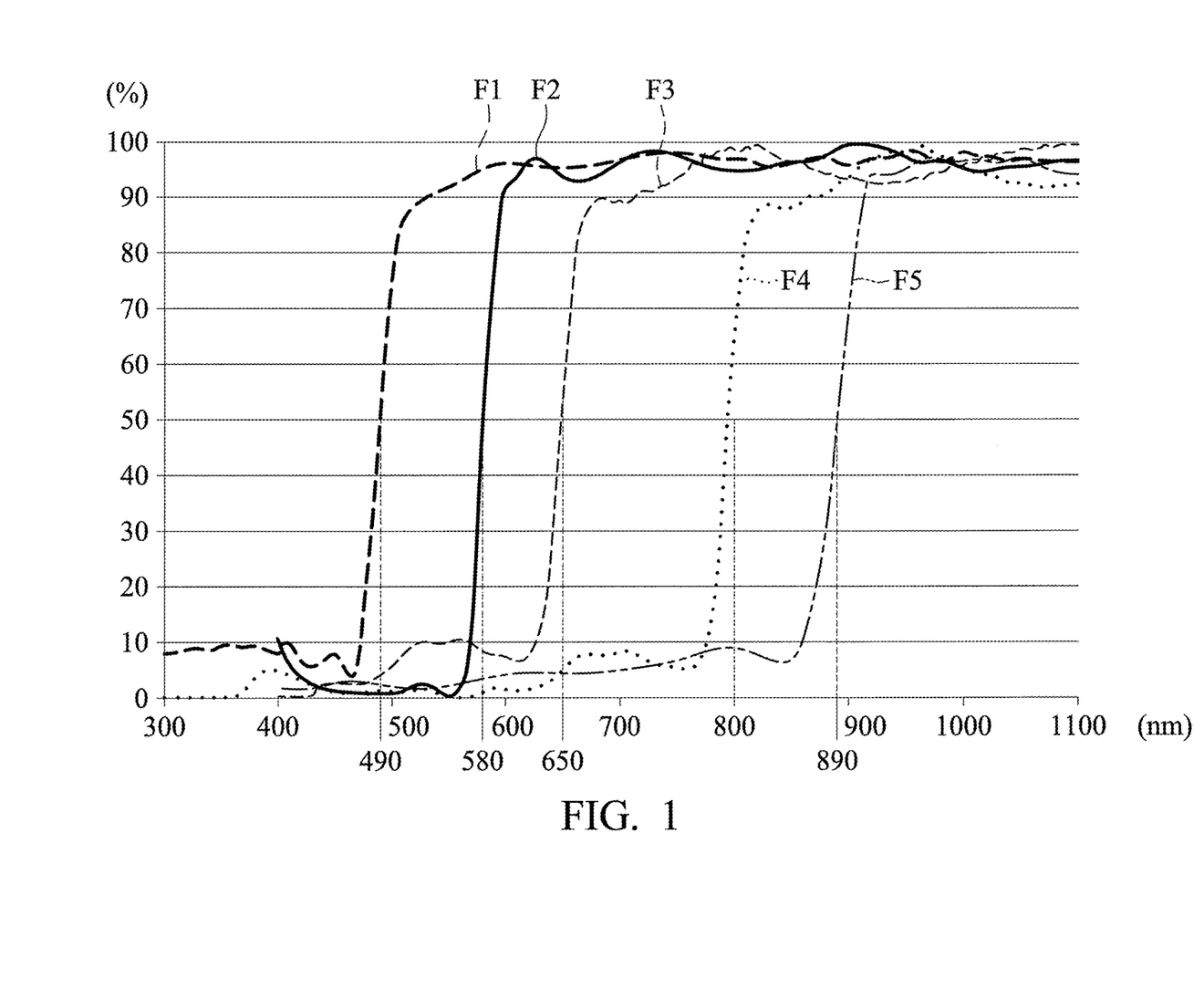
FIG. 1 is a transmittance vs. wavelength diagram of the transmission characteristics of high pass filters in accordance with an embodiment of the present disclosure.

FIG. 1 is a transmittance vs. wavelength diagram of the transmission characteristics of high pass filters in accordance with an embodiment of the present disclosure. There are some existing high pass filters which have good wavelength filtering characteristics. In the embodiment as shown in FIG. 1, the high pass filter F1 absorbs wavelengths of a light beam shorter than 490 nm and allows wavelengths of a light beam longer than 490 nm to pass through, the high pass filter F2 absorbs wavelengths of a light beam shorter than 580 nm and allows wavelengths of a light beam longer than 580 nm to pass through, the high pass filter F3 absorbs wavelengths of a light beam shorter than 650 nm and allows wavelengths of a light beam longer than 650 nm to pass through, the high pass filter F4 absorbs wavelengths of a light beam shorter than 800 nm and allows wavelengths of a light beam longer than 800 nm to pass through, and the high pass filter F5 absorbs wavelengths of a light beam shorter than 890 nm and allows wavelengths of a light beam longer than 890 nm to pass through. Those high pass filters are very good waveband selection tools for the present disclosure.

Figure 2:
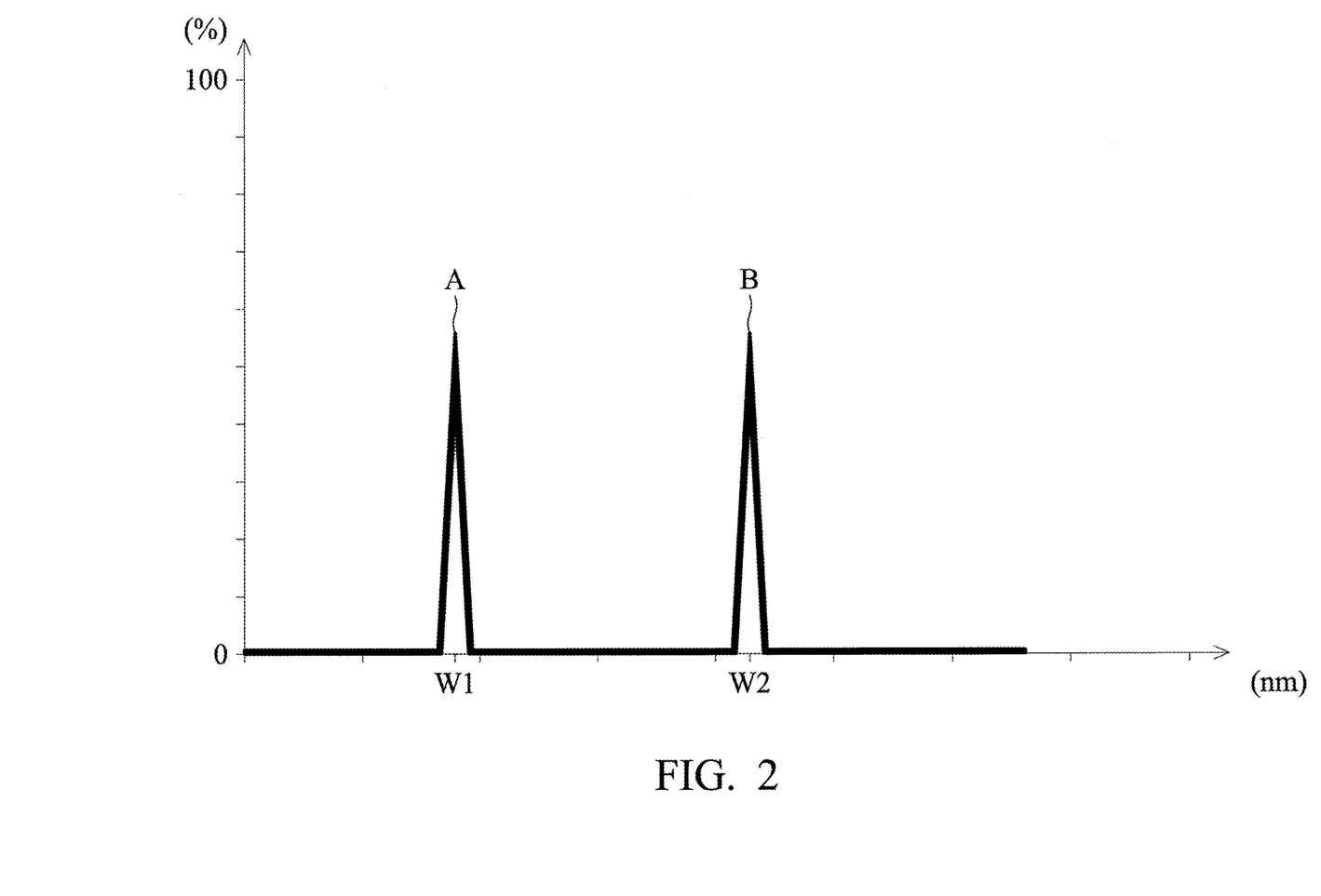
FIG. 2 is a transmittance vs. wavelength diagram of the transmission characteristics of a dual band pass filter in accordance with an embodiment of the present disclosure.

FIG. 2 is a transmittance vs. wavelength diagram of the transmission characteristics of a dual band pass filter in accordance with an embodiment of the present disclosure. The dual band pass filter of the present disclosure is a multi-film interference filter based on Fabry-Perot interference theorem. The dual band pass filter allows two wavebands of a light beam to pass through and blocks the remaining wavebands of the light beam. As shown in FIG. 2, the dual band pass filter allows a very narrow waveband A with a peak wavelength W1 and a very narrow waveband B with a peak wavelength W2 to pass through. In this embodiment, the transmittance of the wavelength W1 and the wavelength W2 of a light beam is almost 100%, and the transmittance of the remaining wavelengths of the light beam is close to 0%. The wavelengths W1 and W2 that pass through the dual band pass filter can be controlled and adjusted by changing the number or the materials of the films of the multi-film interference filter. Therefore, the dual band pass filter is a very good tool to select specified wavelengths of a light beam.

The present disclosure combines the high pass filter with the transmission characteristics shown in FIG. 1 and the dual band pass filter with the transmission characteristics shown in FIG. 2 to achieve a spectrum-inspection device or spectrum meter.

Figure 3:
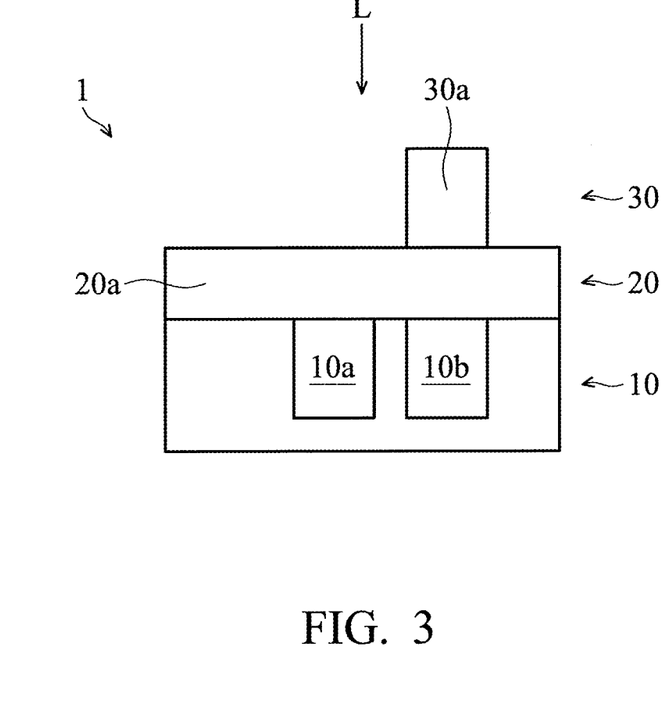
FIG. 3 is a schematic view of a spectrum-inspection device in accordance with an embodiment of the present disclosure.
Figure 4:
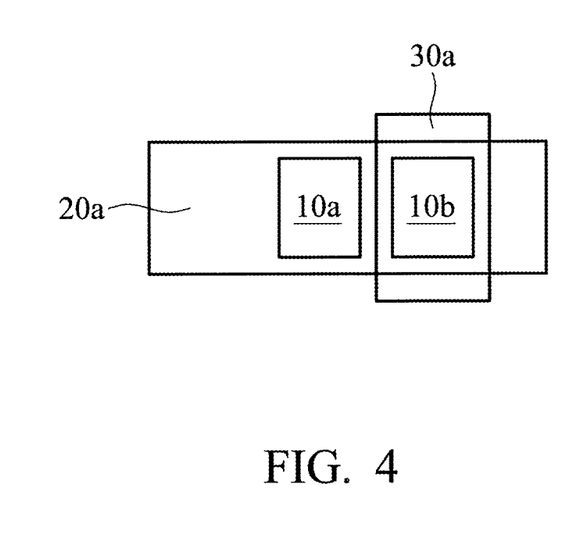
FIG. 4 is a top view of the spectrum-inspection device shown in FIG. 3.

FIG. 3 is a schematic view of a spectrum-inspection device 1 in accordance with an embodiment of the present disclosure. FIG. 4 is a top view of the spectrum-inspection device 1 shown in FIG. 3. The spectrum-inspection device 1 is configured to sense visible wavebands and invisible wavebands of a light beam L reflected by or emitted from samples.

The spectrum-inspection device 1 includes a sensor unit array 10, a dual band filter layer 20, and a high pass filter layer 30. The sensor unit array 10, dual band filter layer 20, and the high pass filter layer 30 are overlaid in sequence from bottom to top.

The sensor unit array 10 includes a pair of sensor units 10a and 10b. The sensor units 10a and 10b can be implemented by CMOS sensor units or CCD sensor units. The dual band filter layer 20 includes a dual-band pass filter 20a which has transmittance characteristics as shown in FIG. 2. The dual-band pass filter 20a is disposed on the sensor unit array 10 and covers both the sensor units 10a and 10b. According to the transmittance vs. wavelength diagram shown in FIG. 2, the dual-band pass filter 20a allows two very narrow wavebands A and B (one has a peak wavelength W1 and the other has a peak wavelength W2) to pass through and blocks the remaining wavebands. The high pass filter layer 30 includes a high pass filter 30a having one of the transmittance characteristics as shown in FIG. 1. The high pass filter 30a is disposed on the dual band filter layer 20 and covers only the sensor unit 10b. According to the transmittance vs. wavelength diagram shown in FIG. 1, the high pass filter 30a allows wavelengths of a light beam longer than a specified wavelength to pass through and absorbs the wavelengths of the light beam shorter than the specified wavelength.

Figure 5:
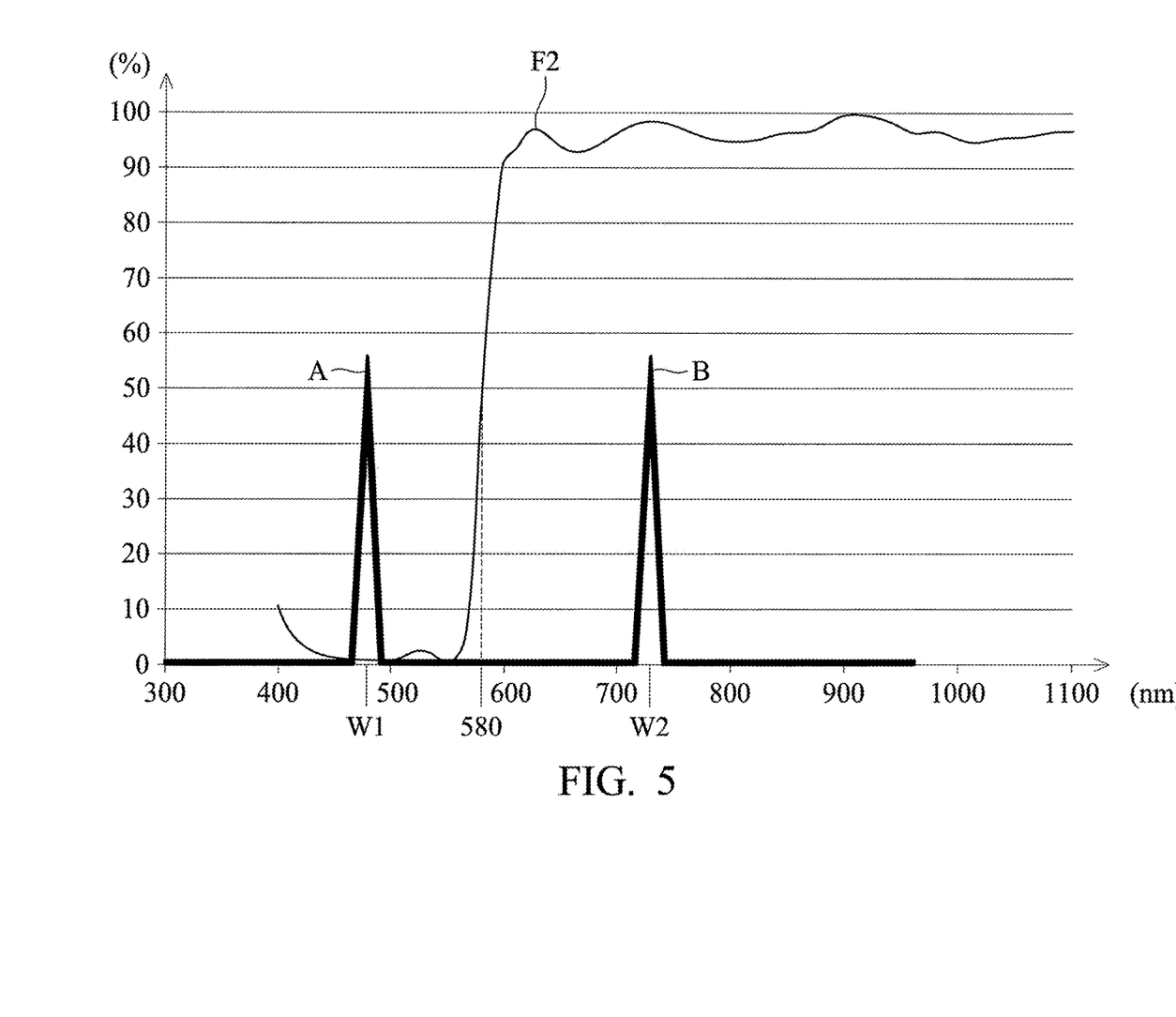
FIG. 5 is a transmittance vs. wavelength diagram of the transmission characteristics of a dual band pass filter and a high pass filter shown in FIGS. 3 and 4 in accordance with an embodiment of the present disclosure.

FIG. 5 is a transmittance vs. wavelength diagram of the transmission characteristics of the dual band pass filter 20a and the high pass filter 30a shown in FIGS. 3 and 4 in accordance with an embodiment of the present disclosure. As shown in FIG. 5, the high pass filter F2 (shown in FIG. 1) which absorbs wavelengths of a light beam shorter than 580 nm and allows wavelengths of a light beam longer than 580 nm to pass through is utilized as the high pass filter 30a shown in FIGS. 4 and 5 as an example. In this case, the dual-band pass filter 20a will be selected appropriately to make the peak wavelength W1 of one pass waveband A shorter than 580 nm and the peak wavelength W2 of the other pass waveband B longer than 580 nm. In this way, the sensor unit 10a collects both the wavebands A and B of the light beam L, because the light beam L only passes through the dual-band pass filter 20a to reach the sensor unit 10a. On the other hand, the sensor unit 10b collects only the waveband B of the light beam L, because the light beam L passes through the high pass filter 30a and the dual-band pass filter 20a to reach the sensor unit 10b. Therefore, the strength of the waveband B can be obtained from the signal or the value generated by the sensor unit 10b, and the strength of the waveband A can be obtained from the signal or the value generated by the sensor unit 10a minus the signal or the value generated by the sensor unit 10b.

According to the embodiment, the disclosure uses a simple structure to sense two wavebands separately. Since the multi-film interference filter that allows two wavebands to pass through is much easier to be manufactured than the multi-film interference filter that allows four wavebands to pass through, the complexity of the process is substantially reduced. Furthermore, the sensor unit array can still be used to capture a 2D image. The application of the spectrum meter is not restricted to one purpose.

Figure 6:
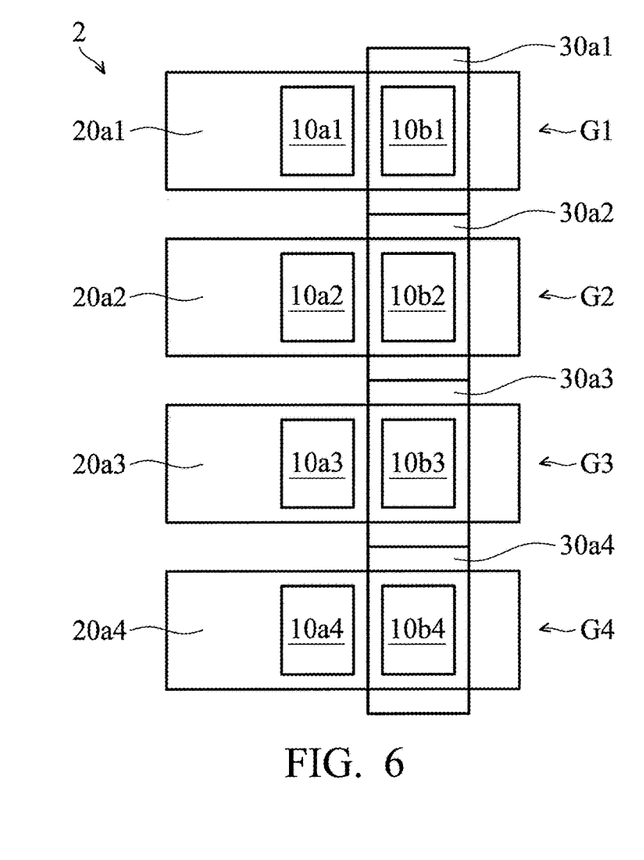
FIG. 6 is a top view of the spectrum-inspection device in accordance with an embodiment of the present disclosure.

FIG. 6 is a top view of the spectrum-inspection device 2 in accordance with an embodiment of the present disclosure. In this embodiment, the spectrum-inspection device 2 is a multi-channel sensor which is designed to sense eight wavebands including visible wavebands and invisible wavebands. The spectrum-inspection device 2 is also a structure formed from a sensor unit array 10, a dual band filter layer 20, and a high pass filter layer 30 overlaid in sequence from bottom to top.

The sensor unit array 10 includes eight sensor units 10a1, 10b1, 10a2, 10b2, 10a3, 10b3, 10a4, and 10b4. All sensor units can be implemented by CMOS sensor units or CCD sensor units. The dual band filter layer 20 is disposed on the sensor unit array 10 and includes four dual-band pass filters 20a1, 20a2, 20a3, and 20a4. The dual-band pass filter 20a1 covers the sensor units 10a1 and 10b1. The dual-band pass filter 20a2 covers the sensor units 10a2 and 10b2. The dual-band pass filter 20a3 covers the sensor units 10a3 and 10b3. The dual-band pass filter 20a4 covers the sensor units 10a4 and 10b4. The high pass filter layer 30 is disposed on the dual band filter layer 20 and includes four high pass filter 30a1, 30a2, 30a3, and 30a4. The high pass filter 30a1 covers only the sensor unit 10b1. The high pass filter 30a2 covers only the sensor unit 10b2. The high pass filter 30a3 covers only the sensor unit 10b3. The high pass filter 30a4 covers only the sensor unit 10b4. Every two sensor units covered by the same dual-band pass filter can be deemed as a sensor unit group. As shown in FIG. 6, there are four sensor unit groups G1, G2, G3, and G4. With this structure, each sensor unit group can sense two individual wavebands.

Figure 7:
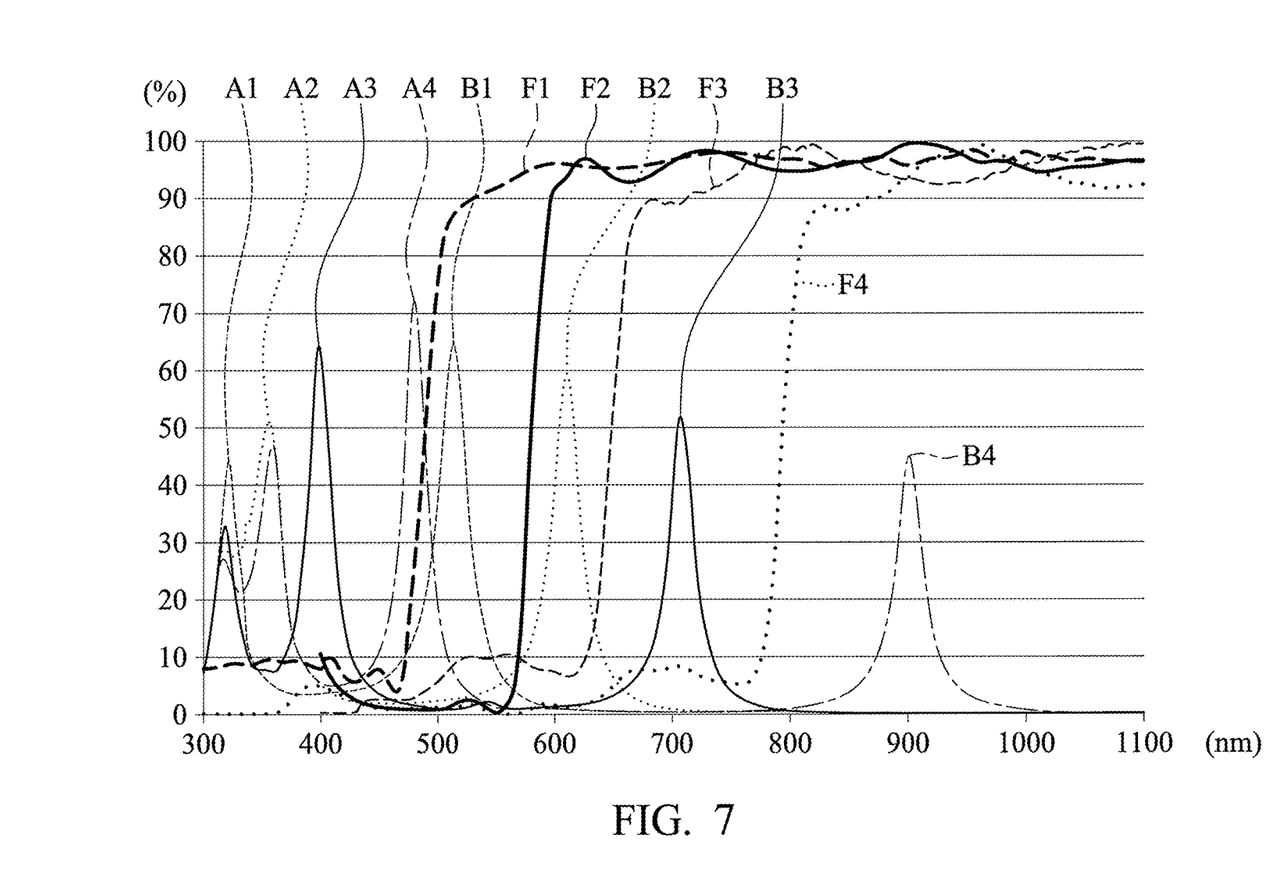
FIG. 7 is a transmittance vs. wavelength diagram of the transmission characteristics of dual band pass filters and high pass filters shown in FIG. 6 in accordance with an embodiment of the present disclosure.

FIG. 7 is a transmittance vs. wavelength diagram of the transmission characteristics of the dual band pass filters 20a1~20a4 and the high pass filters 30a1~30a4 shown in FIG. 6 in accordance with an embodiment of the present disclosure. As shown in FIG. 7, the high pass filter F1 which absorbs wavelengths of a light beam shorter than 490 nm and allows wavelengths of a light beam longer than 490 nm to pass through is utilized as the high pass filter 30a1; the high pass filter F2 which absorbs wavelengths of a light beam shorter than 580 nm and allows wavelengths of a light beam longer than 580 nm to pass through is utilized as the high pass filter 30a2; the high pass filter F3 which absorbs wavelengths of a light beam shorter than 650 nm and allows wavelengths of a light beam longer than 650 nm to pass through is utilized as the high pass filter 30a3; and the high pass filter F4 which absorbs wavelengths of a light beam shorter than 800 nm and allows wavelengths of a light beam longer than 800 nm to pass through is utilized as the high pass filter 30a4. In this case, the dual-band pass filter 20a1 will be selected appropriately such that the peak wavelength of one pass waveband A1 is shorter than 490 nm and the peak wavelength of the other pass waveband B1 is longer than 490 nm; the dual-band pass filter 20a2 will be selected appropriately such that the peak wavelength of one pass waveband A2 is shorter than 580 nm and the peak wavelength of the other pass waveband B2 is longer than 580 nm; the dual-band pass filter 20a3 will be selected appropriately such that the peak wavelength of one pass waveband A3 is shorter than 650 nm and the peak wavelength of the other pass waveband B3 is longer than 650 nm; and the dual-band pass filter 20a4 will be selected appropriately such that the peak wavelength of one pass waveband A4 is shorter than 800 nm and the peak wavelength of the other pass waveband B4 is longer than 800 nm.

The peak wavelengths of the wavebands A1, A2, A3, and A4 are different from each other and the peak wavelengths of the wavebands B1, B2, B3, and B4 are different from each other. Therefore, an eight-channel sensor is provided to sense eight different wavebands of a light beam. Specifically, the sensor unit 10a1 collects both the wavebands A1 and B1 of a light beam, and the sensor unit 10b1 collects only the waveband B1 of the light beam. Therefore, the strength of the waveband B1 can be obtained from the signal or the value generated by the sensor unit 10b1, and the strength of the waveband A1 can be obtained from the signal or the value generated by the sensor unit 10a1 minus the signal or the value generated by the sensor unit 10b1. The sensor unit 10a2 collects both the wavebands A2 and B2 of a light beam, and the sensor unit 10b2 collects only the waveband B2 of the light beam. Therefore, the strength of the waveband B2 can be obtained from the signal or the value generated by the sensor unit 10b2, and the strength of the waveband A2 can be obtained from the signal or the value generated by the sensor unit 10a2 minus the signal or the value generated by the sensor unit 10b2. The sensor unit 10a3 collects both the wavebands A3 and B3 of a light beam, and the sensor unit 10b3 collects only the waveband B3 of the light beam. Therefore, the strength of the waveband B3 can be obtained from the signal or the value generated by the sensor unit 10b3, and the strength of the waveband A3 can be obtained from the signal or the value generated by the sensor unit 10a3 minus the signal or the value generated by the sensor unit 10b3. The sensor unit 10a4 collects both the wavebands A4 and B4 of a light beam, and the sensor unit 10b4 collects only the waveband B4 of the light beam. Therefore, the strength of the waveband B4 can be obtained from the signal or the value generated by the sensor unit 10b4, and the strength of the waveband A4 can be obtained from the signal or the value generated by the sensor unit 10a4 minus the signal or the value generated by the sensor unit 10b4.

Figure 8:
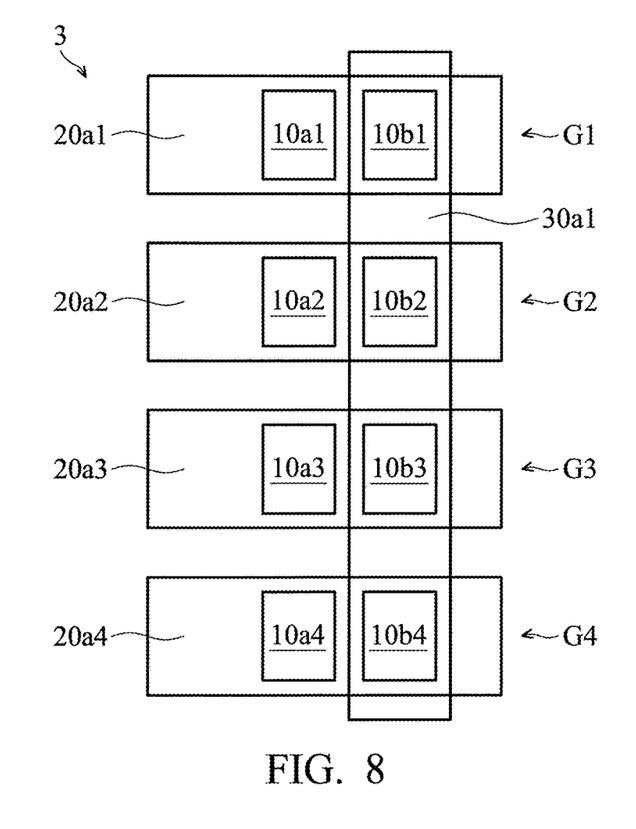
FIG. 8 is a top view of the spectrum-inspection device in accordance with an embodiment of the present disclosure.
Figure 9:
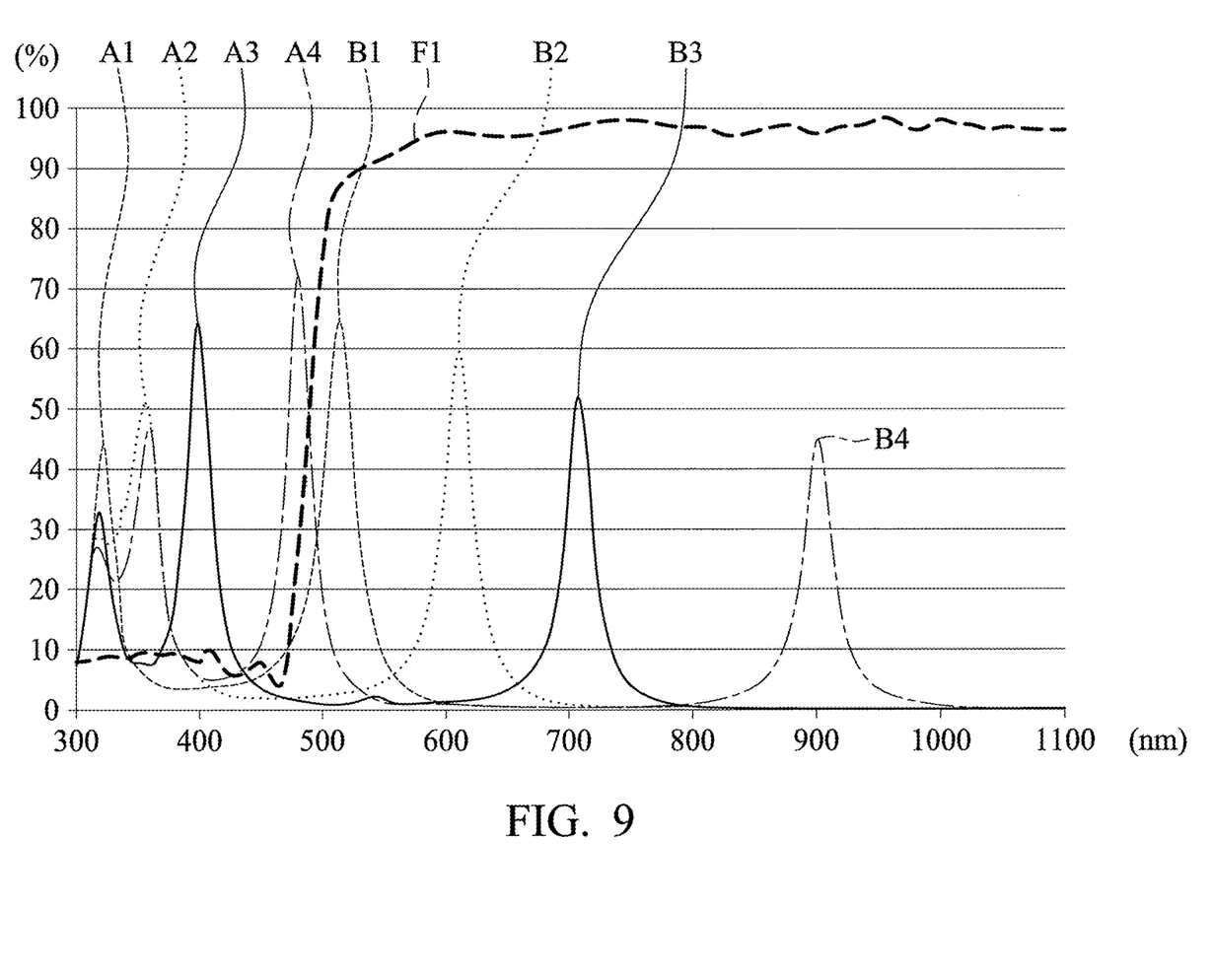
FIG. 9 is a transmittance vs. wavelength diagram of the transmission characteristics of the dual band pass filters and the high pass filter shown in FIG. 8 in accordance with an embodiment of the present disclosure.

FIG. 8 is a top view of the spectrum-inspection device 3 in accordance with an embodiment of the present disclosure. FIG. 9 is a transmittance vs. wavelength diagram of the transmission characteristics of the dual band pass filters 20a1~20a4 and the high pass filter 30a1 shown in FIG. 8 in accordance with an embodiment of the present disclosure. The spectrum-inspection device 3 shown in FIG. 8 is variation example of the spectrum-inspection device 2 shown in FIG. 6. As shown in FIG. 8, four sensor unit groups G1, G2, G3, and G4 shares the same high pass filter 30a1. The high pass filter 30a1 covers the sensor unit 10b1, 10b2, 10b3, and 10b4. In this embodiment, there is a high pass filter 30a1 which can separate two pass wavebands of all of the dual band pass filters 20a1, 20a2, 20a3, and 20a4. Specifically, as shown in FIG. 9, the high pass filter F1 which has a cut wavelength 490 nm is utilized as the high pass filter 30a1. The cut wavelength 490 nm separates the group of the wavebands A1~A4 and the group of the wavebands B1~B4. Therefore, the spectrum-inspection device 3 can also sense or inspect eight wavebands as well as the spectrum-inspection device 2. Furthermore, the structure of spectrum-inspection device 3 is simpler than the structure of spectrum-inspection device 2.

In the above embodiments, the dual band pass filters F1, F2, F3, and F4 which have one of the cut wavelengths 490, 580, 650, and 800 nm respectively are utilized as the dual band pass filters 20a1, 20a2, 20a3, and 20a4. However, the disclosure is not limited thereto. Any four of the dual band pass filters F1~F5 can be utilized as the dual band pass filters 20a1~20a4. For example, the dual band pass filters F1, F2, F3, and F5 which have one of the cut wavelengths 490, 580, 650, and 890 nm respectively are utilized as the dual band pass filters 20a1, 20a2, 20a3, and 20a4.

Moreover, the above embodiments provides a spectrum-inspection device 1 to sense or inspect two wavebands of an incident light beam and a spectrum-inspection device 2 to sense or inspect eight wavebands of an incident light beam. However, the disclosure is not limited thereto. A spectrum-inspection device can be made to sense or inspect any even number of wavebands of an incident light beam. For example, a spectrum-inspection device has any two sensor unit groups of the four sensor unit groups G1, G2, G3, and G4 shown in FIG. 6 so as to sense or inspect four wavebands of an incident light beam, or a spectrum-inspection device has any three sensor unit groups of the four sensor unit groups G1, G2, G3, and G4 shown in FIG. 6 so as to sense or inspect six wavebands of an incident light beam.

In conclusion, a simple structure to sense eight wavebands separately can be obtained. Since a multi-film interference filter that allows two wavebands to pass through is much easier to manufacture than a multi-film interference filter that allows four wavebands to pass through, the complexity of the process is substantially reduced. Furthermore, the sensor unit array can still be used to capture a 2D image. The application of the spectrum meter is not restricted to one purpose.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A spectrum-inspection device, comprising:
   a sensor unit array comprising a first sensor unit and a second sensor unit;
   a dual-band pass filter disposed on the sensor unit array to cover the first sensor unit and the second sensor unit, wherein the dual-band pass filter allows a first waveband and a second waveband of a light beam to pass through;
   a filter disposed on the dual-band pass filter to cover the second sensor unit, wherein the filter allows wavelengths of a light beam longer than a first wavelength to pass through;
   a second dual-band pass filter disposed on the sensor unit array; and
   a second filter disposed on the second dual-band pass filter,
   wherein the first wavelength is longer than a peak wavelength of the first waveband and shorter than a peak wavelength of the second waveband,
   the sensor unit array comprises a third sensor unit and a fourth sensor unit,
   the second dual-band pass filter covers the third sensor unit and the fourth sensor unit and allows a third waveband and a fourth waveband of a light beam to pass through,
   the second filter covers the fourth sensor unit and allows wavelengths of a light beam longer than a second wavelength to pass through, and
   the second wavelength is longer than a peak wavelength of the third waveband and shorter than a peak wavelength of the fourth waveband, and
   the peak wavelength of the third waveband is longer than the peak wavelength of the first waveband and shorter than the peak wavelength of the second waveband, and
   the peak wavelength of the fourth waveband is longer than the peak wavelength of the second waveband.

2. The spectrum-inspection device as claimed in claim 1, further comprising:
   a third dual-band pass filter disposed on the sensor unit array; and
   a third filter disposed on the third dual-band pass filter,
   wherein the sensor unit array comprises a fifth sensor unit and a sixth sensor unit,
   the third dual-band pass filter covers the fifth sensor unit and the sixth sensor unit and allows a fifth waveband and a sixth waveband of a light beam to pass through,
   the third filter covers the sixth sensor unit and allows wavelengths of a light beam longer than a third wavelength to pass through, and
   the third wavelength is longer than a peak wavelength of the fifth waveband and shorter than a peak wavelength of the sixth waveband.

3. The spectrum-inspection device as claimed in claim 2, wherein
   the peak wavelength of the fifth waveband is longer than the peak wavelength of the third waveband and shorter than the peak wavelength of the second waveband, and
   the peak wavelength of the sixth waveband is longer than the peak wavelength of the fourth waveband.

4. The spectrum-inspection device as claimed in claim 2, further comprising:
   a fourth dual-band pass filter disposed on the sensor unit array; and
   a fourth filter disposed on the third dual-band pass filter,
   wherein the sensor unit array comprises a seventh sensor unit and an eighth sensor unit, and
   the fourth dual-band pass filter covers the seventh sensor unit and the eighth sensor unit and allows a seventh waveband and a eighth waveband of a light beam to pass through,
   the fourth filter covers the eighth sensor unit and allows wavelengths of a light beam longer than a fourth wavelength to pass through, and
   the fourth wavelength is longer than a peak wavelength of the seventh waveband and shorter than a peak wavelength of the eighth waveband.

5. The spectrum-inspection device as claimed in claim 4, wherein
   the peak wavelength of the fifth waveband is longer than the peak wavelength of the third waveband and shorter than the peak wavelength of the second waveband, and
   the peak wavelength of the sixth waveband is longer than the peak wavelength of the fourth waveband, and
   the peak wavelength of the seventh waveband is longer than the peak wavelength of the fifth waveband and shorter than the peak wavelength of the second waveband, and the peak wavelength of the eighth waveband is longer than the peak wavelength of the sixth waveband.

6. The spectrum-inspection device as claimed in claim 4, wherein the first wavelength is 490 nm, the second wavelength is 580 nm, the third wavelength is 650 nm, and the fourth wavelength is 800 nm.

7. The spectrum-inspection device as claimed in claim 4, wherein the first wavelength is 490 nm, the second wavelength is 580 nm, the third wavelength is 650 nm, and the fourth wavelength is 890 nm.

8. The spectrum-inspection device as claimed in claim 4, wherein all of the first wavelength, the second wavelength, the third wavelength, and the fourth wavelength are 490 nm.

* * * * *